United States Patent [19]

Hoeboer

[11] 4,168,776

[45] Sep. 25, 1979

[54] ACCUMULATOR APPARATUS

[75] Inventor: Cornelis H. W. Hoeboer, Hilvarenbeek, Netherlands

[73] Assignee: Mapatent N.V., Curacao, Netherlands Antilles

[21] Appl. No.: 845,127

[22] Filed: Oct. 25, 1977

[51] Int. Cl.² ............................................. B65H 17/12
[52] U.S. Cl. ..................................................... 198/797
[58] Field of Search .............. 198/347, 655, 706, 793, 198/796, 797, 800, 802, 844

[56] References Cited

U.S. PATENT DOCUMENTS

| | | | |
|---|---|---|---|
| 1,086,398 | 2/1914 | Renner | 198/796 |
| 2,858,763 | 11/1958 | Bloom | 198/796 |
| 2,932,376 | 4/1960 | Millington | 198/463 |
| 2,933,176 | 4/1960 | Mansson | 198/347 |
| 3,044,602 | 7/1962 | Amato | 198/706 |
| 3,146,730 | 9/1964 | White | 198/796 |
| 3,224,564 | 12/1965 | Kay | 198/800 |
| 3,381,796 | 5/1968 | Gregor | 198/706 |
| 3,506,105 | 4/1970 | Stauber | 198/793 |
| 3,557,940 | 1/1971 | Rogers et al. | 198/796 |
| 3,910,406 | 10/1975 | Pulver et al. | 198/844 |

Primary Examiner—Richard A. Schacher
Attorney, Agent, or Firm—Michael, Best & Friedrich

[57] ABSTRACT

Accumulator apparatus including spaced frame members with an accumulator space therebetween. Alternate pairs of fixed axis sprockets and slidable take up sprockets are mounted on opposite sides of the frame. A pair of endless chain members are reeved over the sprockets and have a plurality of gondola assemblies mounted therebetween. Separate drive units are provided to drive the chains at the infeed and outfeed ends thereof.

12 Claims, 15 Drawing Figures

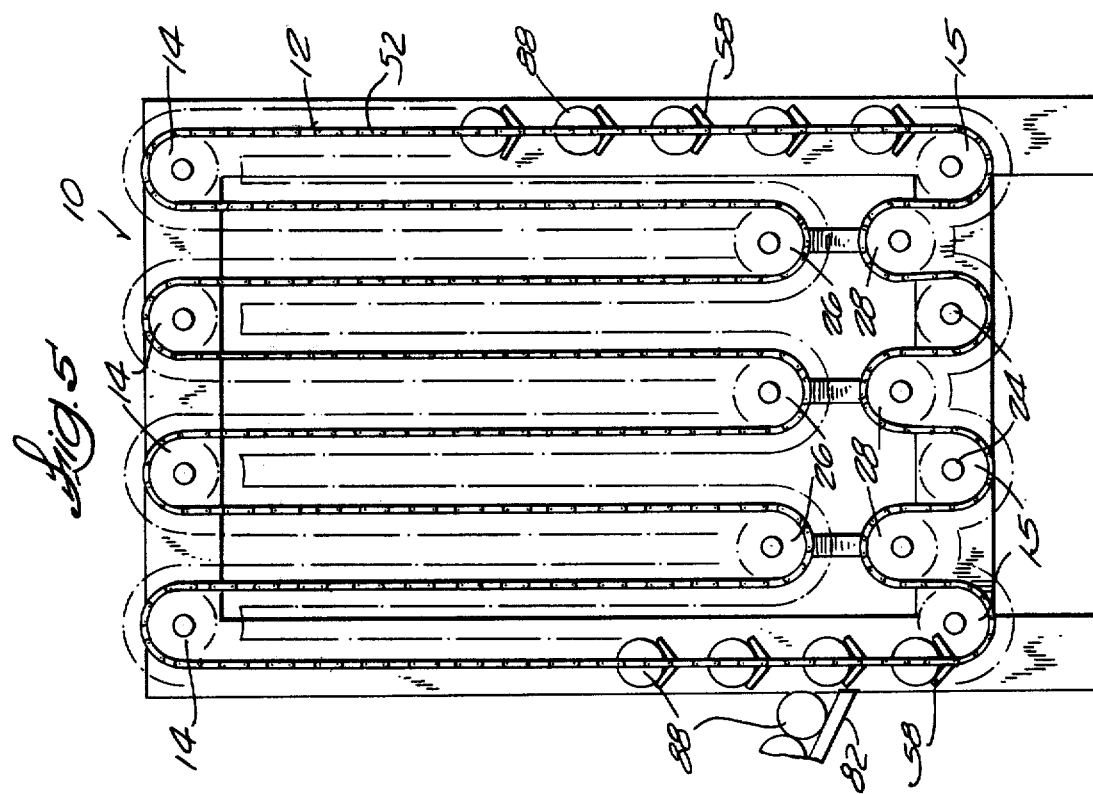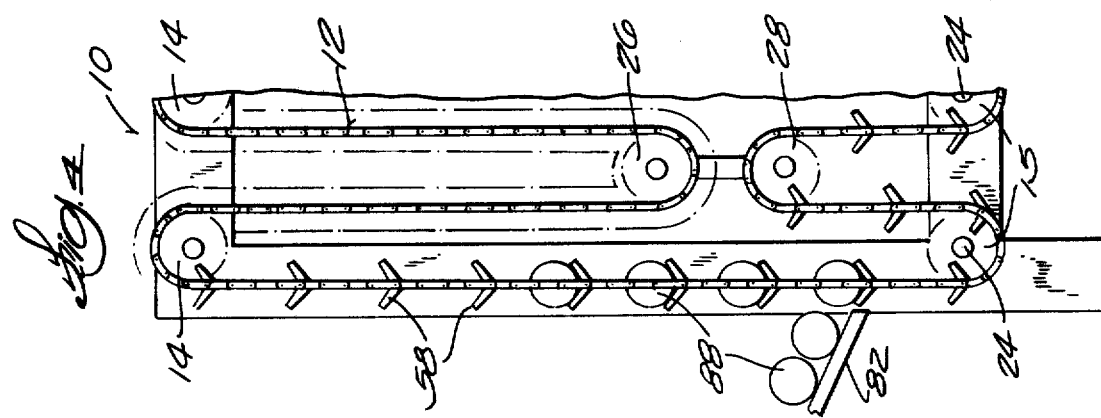

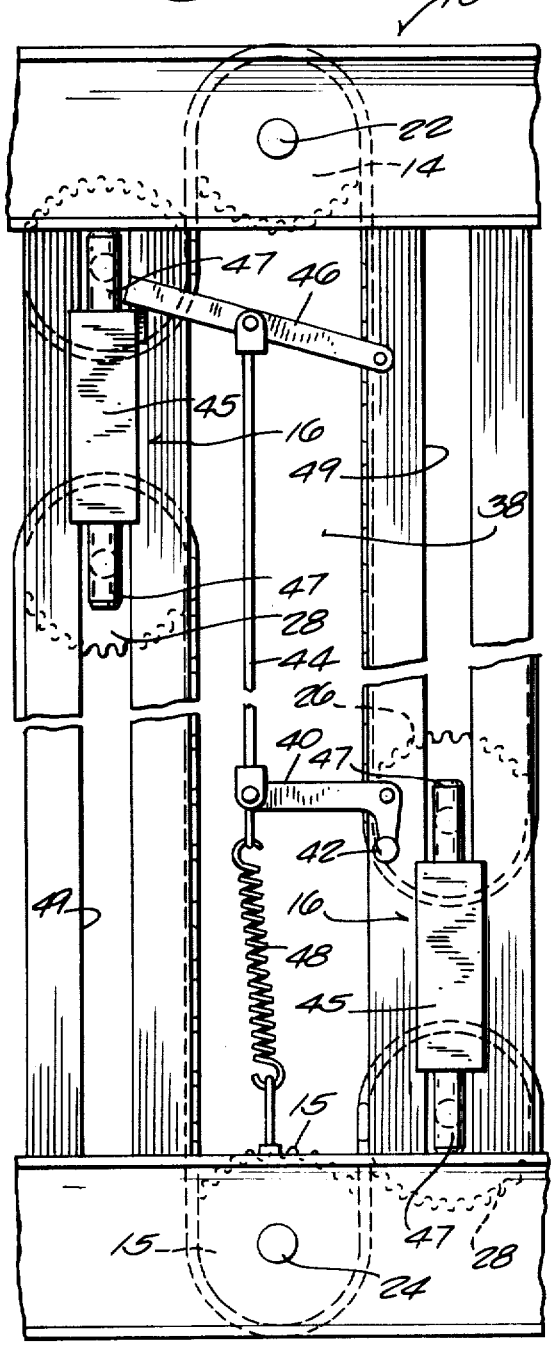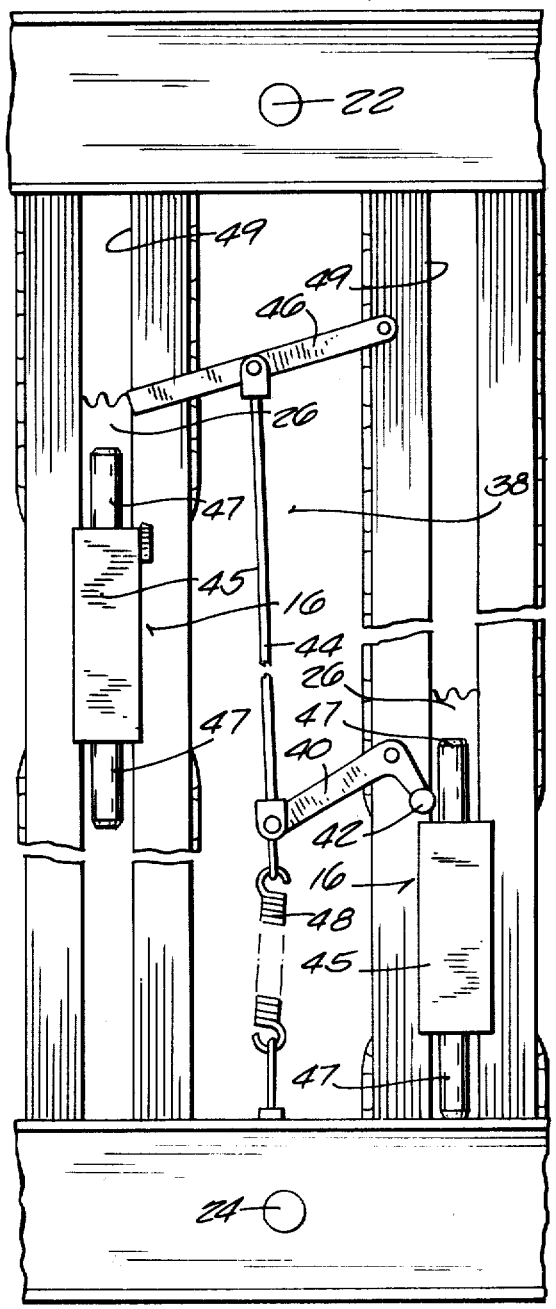

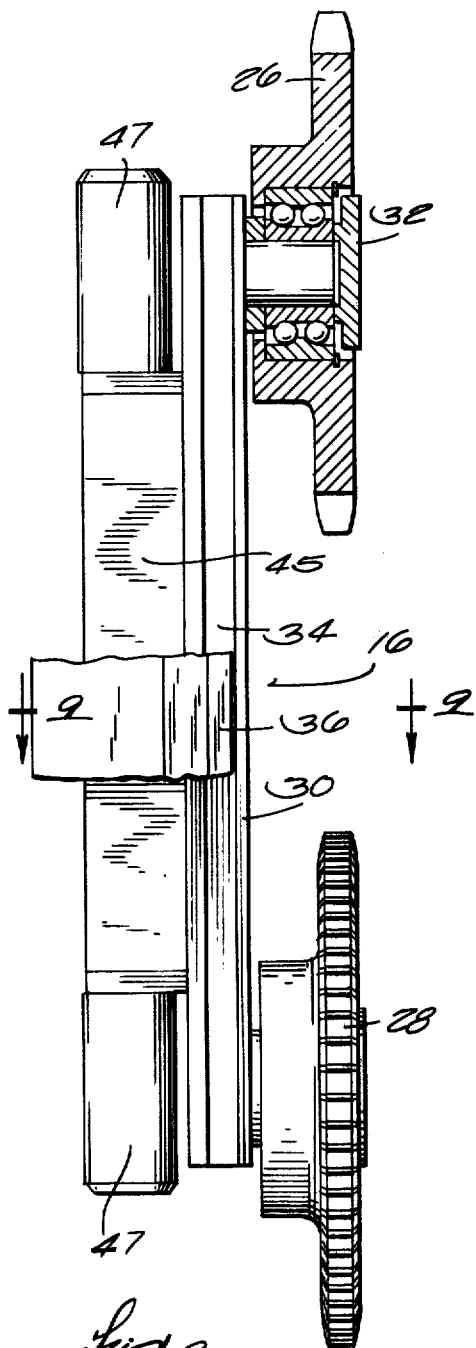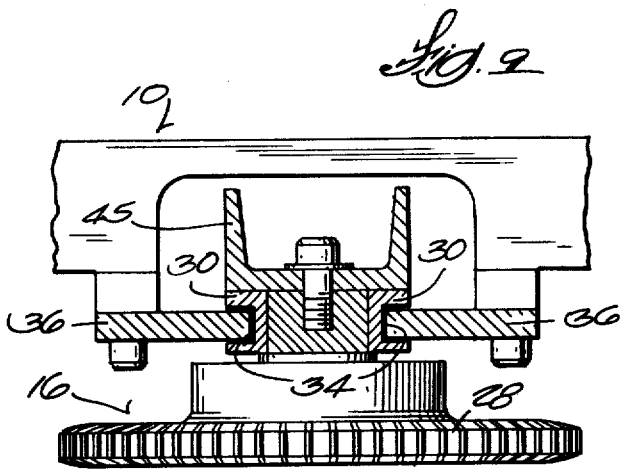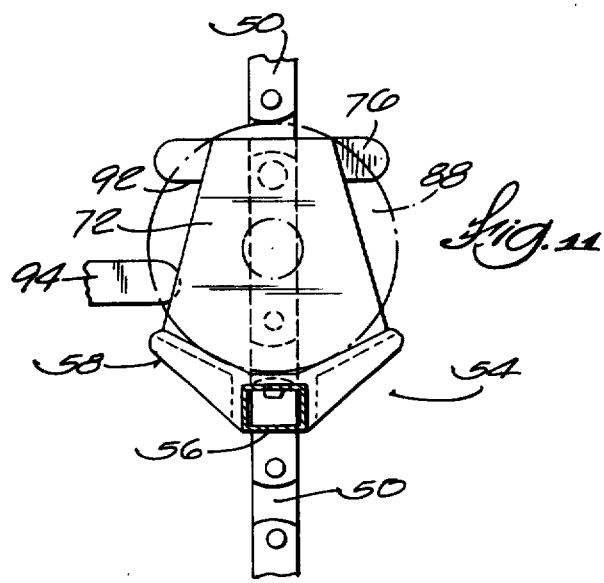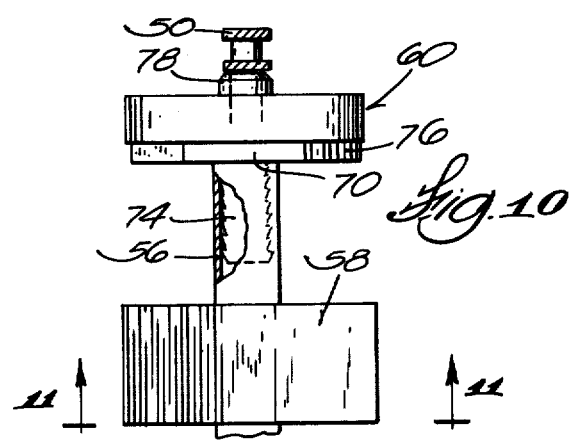

ACCUMULATOR APPARATUS

BACKGROUND OF THE INVENTION

This invention relates to an apparatus for accumulating articles as they are conveyed along a production line. More particularly, the accumulator apparatus shown and described herein was designed for use in the manufacture of rolls of paper commonly known as toilet tissue and is adapted to handle the product when in the form of elongated rolls of paper called "logs" after the ends of the paper rolled up on the logs has been glued and before the logs have been sawed and packaged. Such apparatus is capable of either simultaneously accepting and discharging logs therefrom, accepting logs only and discharging logs only. The device therefor is designed to accommodate a shut down upstream thereof without affecting the flow of logs downstream thereof and conversely the device can accommodate a shut down downstream thereof without affecting the flow of logs upstream thereof.

SUMMARY OF THE INVENTION

An accumulator apparatus comprising a frame having spaced sides with an accumulator space therebetween said accumulator space having an infeed end and an outfeed end. Pairs of fixed axis sprockets are mounted on the opposite spaced sides of the frame at both the infeed and the outfeed ends thereof. At least one pair of take up sprockets is mounted on the spaced sides of the frame intermediate said pairs of fixed axis sprockets. Said pairs of take up sprockets are mounted to slide as a unit on the frame. A conveyor means is provided and includes a pair of spaced endless conveyor chains reeved over the fixed axis and slidable axis sprockets mounted on the opposite sides of the frame. A plurality of gondola assemblies are mounted between the spaced chains and each of said assemblies is comprised of a cross member, a plurality of plastic cradle members mounted on the cross member and a pair of plastic end members fastened to the ends of the cross member. Separate drive units are provided for selectively driving the spaced conveyor chains at the infeed and at the outfeed of the unit.

DESCRIPTION OF THE DRAWINGS

FIG. 4 is a fragmentary view similar to FIG. 3 but showing the apparatus after it has started its accumulator function;

FIG. 5 is a view similar to FIG. 3 but showing the apparatus in a condition of maximum accumulation;

FIG. 6 is an enlarged fragmentary side elevation view (with some parts broken away) of the locking mechanism for the slidably mounted take-up sprocket assemblies as viewed from the opposite side of the accumulator apparatus as that shown in FIG. 1;

FIG. 7 is a view similar to FIG. 6 but showing the locking mechanism in its locking position;

FIG. 8 is an enlarged fragmentary side elevation view of one slidable sprocket assembly;

FIG. 9 is a fragmentary sectional view taken along line 9—9 of FIG. 8;

FIG. 10 is a fragmentary top plan view of one of the gondola assemblies used in the conveyor assembly of the accumulator apparatus;

FIG. 11 is a view taken along line 11—11 of FIG. 10;

DESCRIPTION OF THE PREFERRED EMBODIMENT

Figure 1:
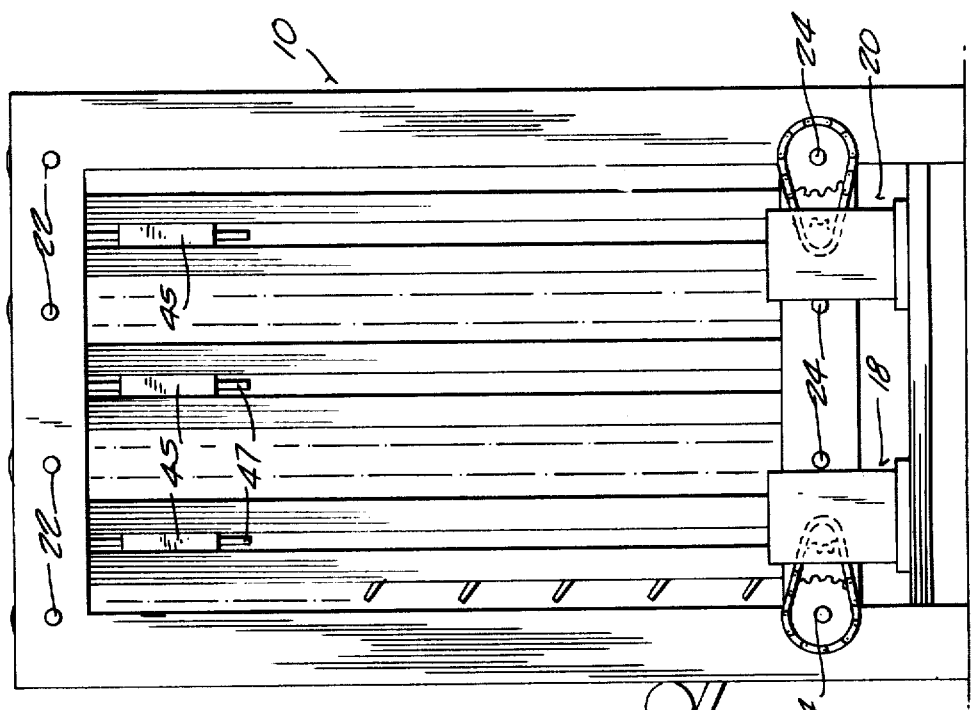
FIG. 1 is a side elevation view of one embodiment of the accumulator apparatus of the present invention.

Referring to the drawings in detail, as best shown in FIGS. 1-5, the accumulator apparatus of the present invention is comprised of the following basic components, namely, a frame structure 10, a conveyor assembly 12, a plurality of upper and lower sprockets 14 and 15 rotatably mounted on fixed axes on the frame, a plurality of take-up sprocket assemblies 16 mounted on a pair of movable axes and infeed and outfeed drive units 18 and 20 respectively.

Upper sprockets 14 are rotatably mounted on opposite sides of frame 10 by means of stub shafts 22 and lower sprockets 15 are rotatably mounted on opposite sides of frame 10 by means of shafts 24 which extend from one side of the frame to the other.

Take-up sprocket assemblies 16 are comprised of upper and lower sprockets 26 and 28 rotatably mounted on a mounting bar 30 by means of stub shafts 32 as best shown in FIGS. 8 and 9.

As best shown in FIG. 9, mounting bar 30 has a pair of grooves 38 in the sides thereof which cooperate with a guide plate 36 bolted to the frame to provide a vertical slidable mounting arrangement for the take-up sprocket assemblies 16.

As best shown in FIGS. 6-9, locking mechanisms 38 are provided for cooperation with take-up sprocket assemblies 16. Each locking mechanism 38 is comprised of an arm 40 pivotally mounted on the frame and having a roller member 42 mounted on the free end thereof. The other end of arm 40 is pivotally connected to the lower end of an actuator rod 44 which in turn is pivotally connected to an actuating arm 46 which in turn is pivotally mounted on the frame 10. A biasing tension spring 48 is connected between the end of rod 44 and the frame. The locking mechanism 38 described above are designed to cooperate with a stop member in the form of a channel 45 having cylindrical end pieces 47 fastened thereto. Channels 45 are bolted to the outer faces of mounting bars 30 and extend to the side exteriors of the machine through slots 49 in the frame. The operation of locking mechanisms 38 will be explained in detail hereinafter.

Conveyor assembly 12 is comprised of a pair of endless chain members 50, 52 and a plurality of gondola assemblies 54 mounted between said chain members. Chain members are reeved over and are in engagement with the teeth of sprockets 14, 15, 26 and 28 in the manner shown in FIG. 3.

As best shown in FIGS. 10 and 11, gondola assemblies 54 are comprised of a tubular cross member 56 (having a rectangular cross section), a plurality of cradle members 58 and a pair of end members 60. Cradle members 58 and end members 60 are preferably made of molded plastic material such as nylon delrin having a smooth, hard surface. Cross members 56 are preferably made of metal such as steel or aluminum.

Figure 13:
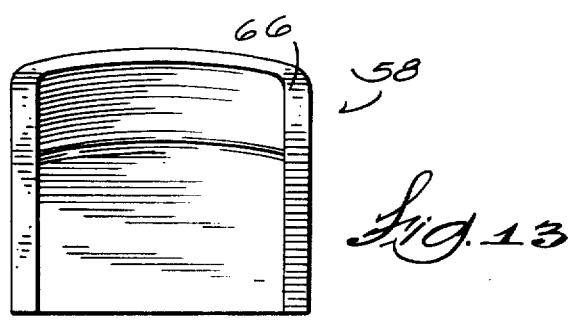
FIG. 13 is a side elevation view of the cradle member shown in FIG. 12.

Cradle members 58 have a flat central support surface 62 and a pair of angled support surfaces 64, 64. Not only do support surfaces 64, 64 angle upwardly from center surface 62 but such surfaces are also curved from edge to edge as best shown in FIG. 13. Cradle members 58 are provided with a pair of depending leg portions 66, 66 which form a notch 68 for receiving a cross member 56. Legs 66, 66 are provided with retaining lips 70, 70 for snap engagement with the underside of cross members 56. Cradle members 58 are assembled onto cross members 56 by forcing the cross member into the notch 68 of the cradle member until retaining lips 70, 70 snap into engagement with the bottom surface of the cross member. The cradle members can be slidably adjusted on the cross member to space the cradle members as desired. When properly spaced, the cradle members can be secured to the cross member by any suitable means such as a cap screw (not shown).

As best shown in FIGS. 10 and 11, end members 60 are comprised of a plate-like body portion 72 having a mounting knob 74 formed at the lower end thereof and a tilting cam 76 formed at the upper end thereof. Knobs 74 are dimensioned to make a tight fit with the inside surfaces of cross members 56 so that the end members can be easily and securely mounted on opposite ends of the cross members by pressing knobs 74 into the open ends of the cross member. A bushing portion 78 is formed on the cam portion 76 for receiving a support pin 80. Pins 80 are fastened at one end to chains 50 and 52 and extend into bushings 78 to thereby support the gondola assemblies 54 between the spaced chain members 50, 52. Pins 80 are dimensioned to fit fairly loosely in bushings 78 so that the gondola assemblies can swing freely on the pins between the spaced chains 50, 52.

As best shown in FIGS. 1-5, the accumulator apparatus is provided with an inclined infeed table 82 as shown. Table 82 extends into the path of travel of the infeed (or far left hand ) span of chains 50, 52 and is provided with a plurality of spaced notches 84 in the end thereof which notches are positioned in alignment with the cradle members 58 of the gondola assemblies so that the cradle members will pass through the notches when the machine is in operation. Suitable stops 86 are provided at the end of table 82 to properly position the incoming "logs" 88 at the infeed of the machine.

An outfeed table 90 is provided adjacent the outfeed (or far right hand) span of chains 50, 52 to receive logs 88 as they are discharged from the accumulator apparatus as will be described hereinafter.

Figure 14:
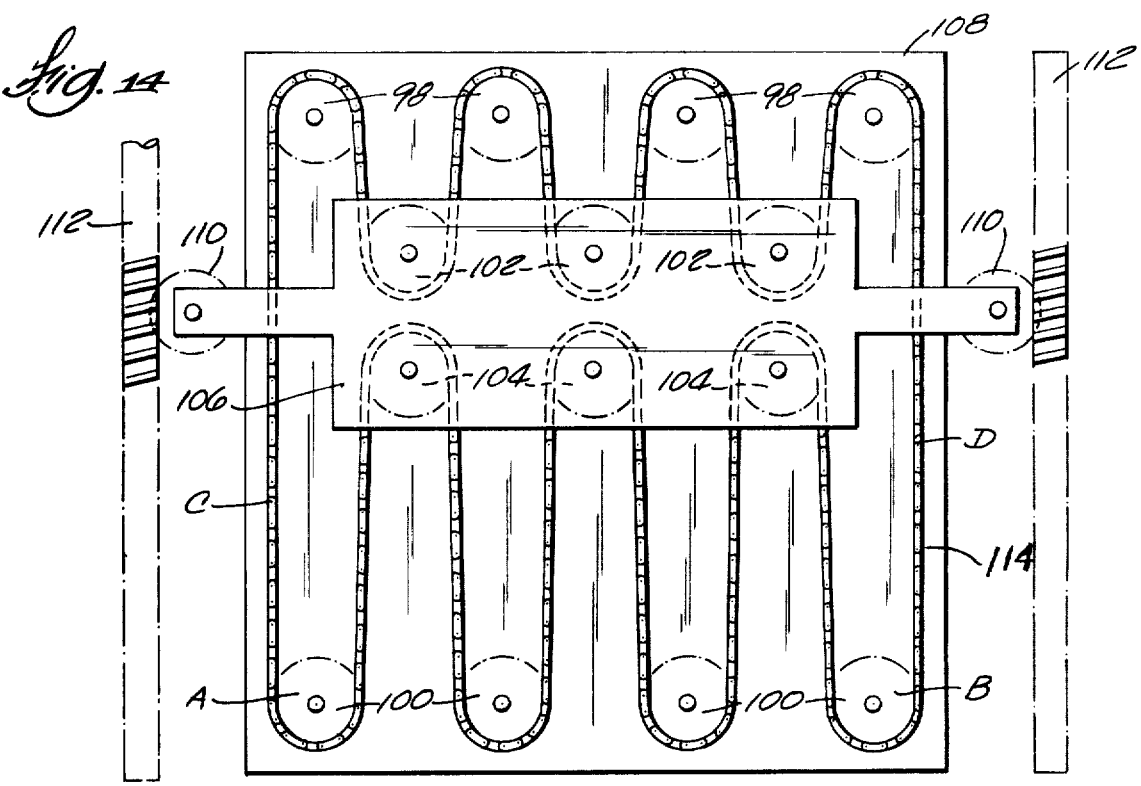
FIGS. 14 and 15 are side elevation schematic views showing modified embodiments of the preferred embodiment.
Figure 15:
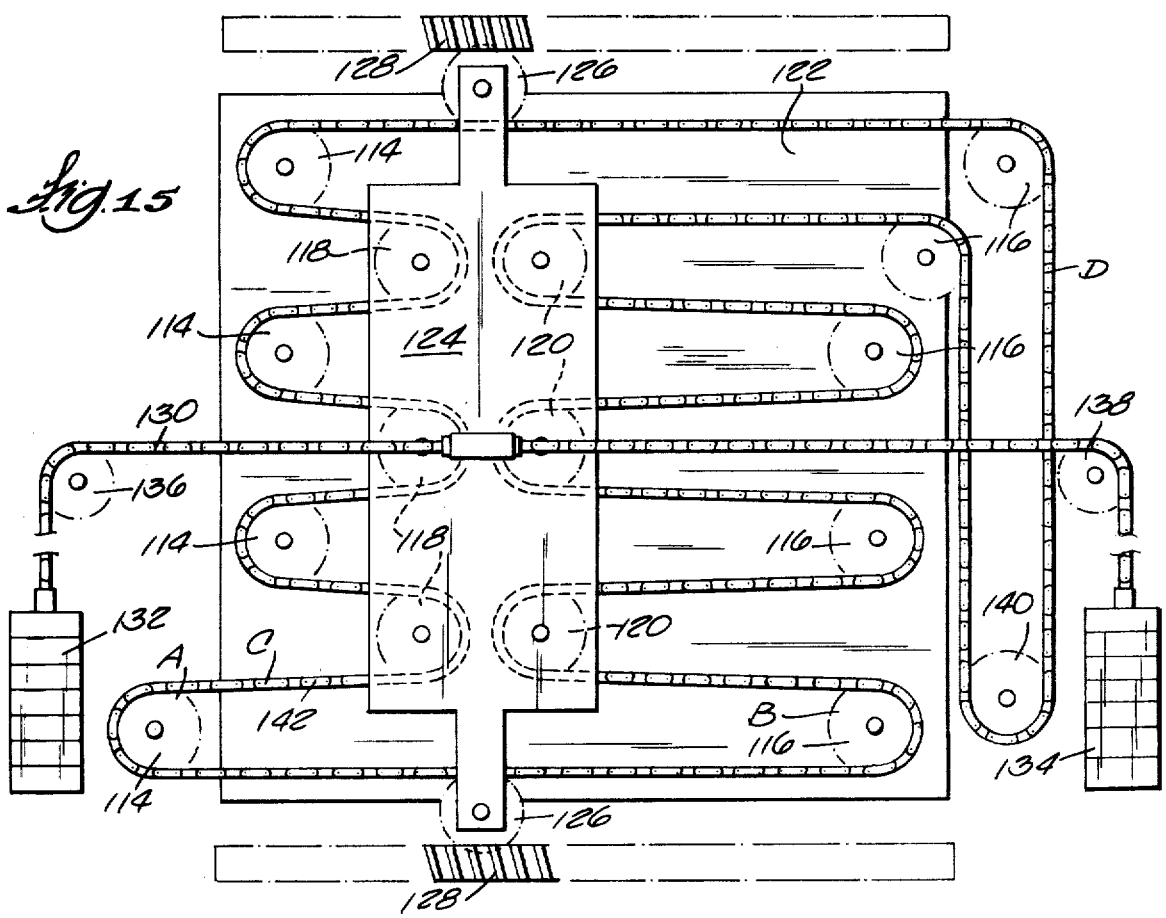

Referring, now, to FIGS. 14 and 15, which show modified embodiments of the preferred embodiment described above, FIG. 14 shows an embodiment comprised of pairs of vertically spaced upper and lower stationary axis sprockets 98, 100 and pairs of vertically spaced pairs of movable axis take-up sprockets 102, 104. Sprockets 98, 100 are rotatably mounted on a frame 108. Take-up sprockets 102, 104 are rotatably mounted on a horizontally extending mounting member 106 which in turn is mounted for vertical sliding movement on the frame 108 by any suitable means (not shown).

Pairs of rack and pinion assemblies 110 and 112, respectively, are provided to stabilize the vertical sliding movements of member 106 on frame 108. An endless chain conveyor member 114 is reeved over sprockets 98, 100, 102 and 104 as shown in FIG. 14. Infeed and outfeed drive units (not shown) are provided to drive the lefthand infeed sprocket 100(A) and the righthand outfeed drive sprocket 100(B) in a manner similar to that described with regard to the preferred embodiment.

Referring, now, to FIG. 15, the accumulator apparatus shown therein is comprised of horizontally spaced pairs of right and lefthand fixed axis sprockets 114, 116 and horizontally spaced pairs of right and lefthand movable axis take-up sprockets 118, 120. Sprockets 114, 116 are rotatably mounted on a frame 122 and take-up sprockets 118, 120 are rotatably mounted on a vertically extending mounting member 128 which in turn is slidably mounted on frame 122 by any suitable means (not shown). Pairs of rack and pinion assemblies 126 and 128, respectively, are provided to stabilize the horizontal sliding movement of member 124 on frame 122. An endless chain conveyor member 142 is reeved over the fixed axis and take-up sprockets as shown in FIG. 15.

The lower lefthand fixed axis sprocket 114(A) is spaced outwardly from the frame of the unit to facilitate loading of articles onto the endless conveyor member 142. Similarly, the upper righthand fixed axis sprocket is spaced outwardly from the frame of the unit on the outfeed side thereof which cooperates with an added fixed axis sprocket 140 to facilitate the unloading of articles from the endless conveyor member 42 at the outfeed of the unit.

A pair of counterweight members 132, 134 are operatively connected to mounting member 124 by a cable 130, such cable being reeved over pulleys 136 and 138. Such counterweight arrangement serves to reduce the forces necessary to impart sliding movement to the mounting member 24 during the operation of the machine. A pair of infeed and outfeed drive units (not shown) are provided to drive the infeed drive sprocket 114(A) and the outfeed drive sprocket 116(B) in a manner similar to that shown in the preferred embodiment described previously.

OPERATION

As indicated previously, while the apparatus of the present invention may have a number of useful applications, the particular embodiment shown in the drawings and described above is particularly designed for use in the manufacture of rolls of paper commonly known as toilet tissue. The apparatus is adapted to handle the product when in an intermediate stage of manufacture, namely, when the product is in the form of so-called "logs" 88 which are long rolls of paper before they are "sawed" up into smaller rolls and packaged for shipment.

The accumulator device is positioned in the production line so that it will receive logs 88 coming from a gluing machine (not shown) which functions to glue the free ends of the paper rolls to the body of the rolls. The logs 88 passing from the accumulator apparatus are carried from outfeed table 90 by some suitable conveyor means (not shown) for further processing, i.e. sawing, packaging, etc.

Figure 3:
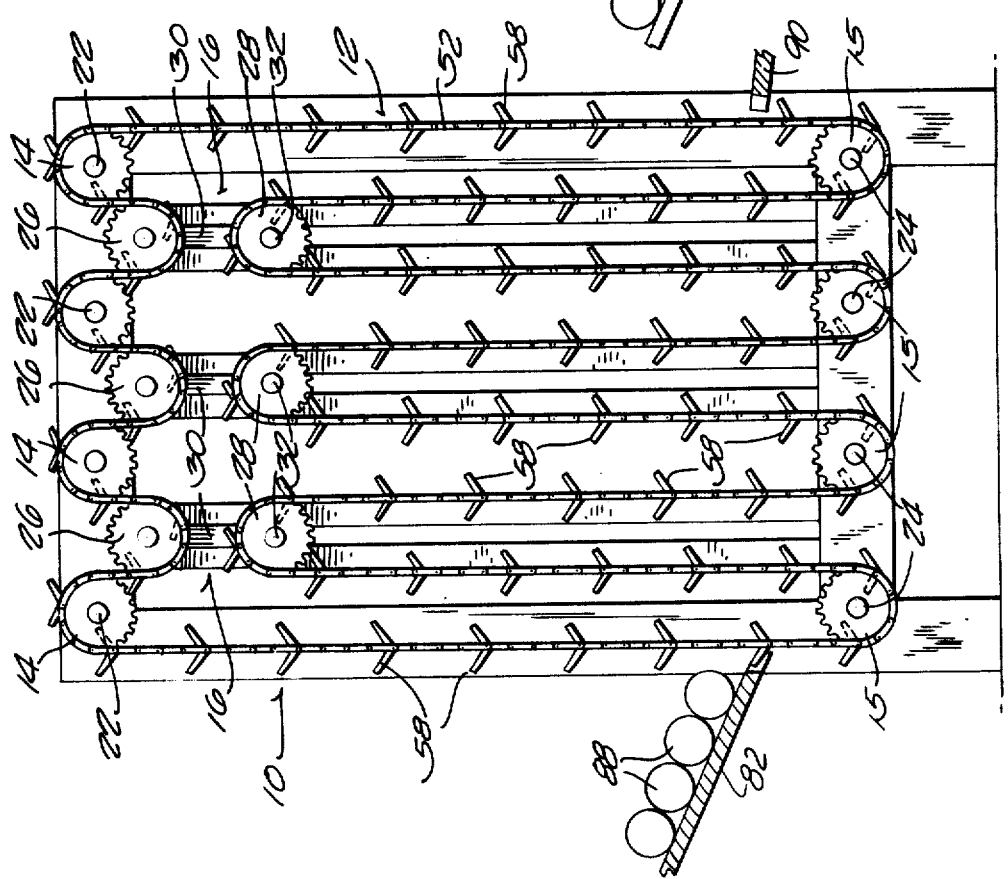
FIG. 3 is a vertical sectional view taken along line 3—3 of FIG. 2.
Figure 2:
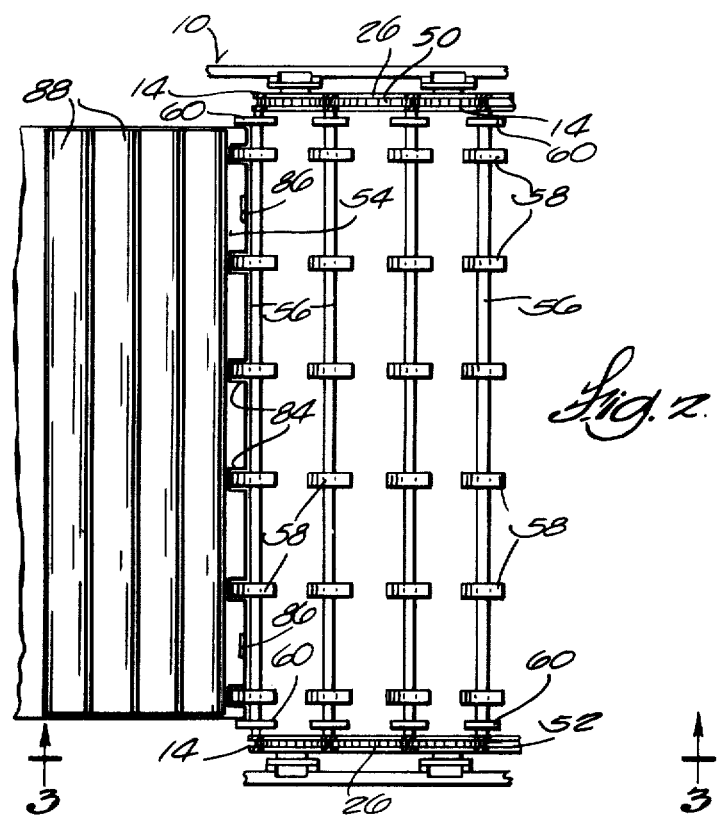
FIG. 2 is a top plan view of the apparatus shown in FIG. 1.
Figure 12:
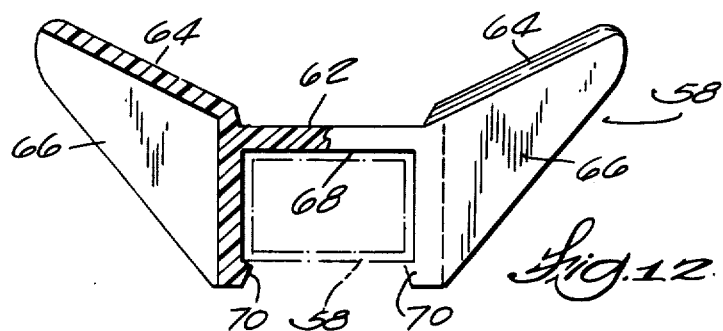
FIG. 12 is an end elevation view of one of the cradle members of the novel gondola assembly used in the present invention.

Assume, now, for purposes of explanation that the accumulator apparatus is in its completely "empty" condition as shown in FIG. 3. Assume, also, that it is desired to feed logs into the accumulator but not to remove any logs therefrom. To accomplish this the operator will energize infeed drive unit 18 while maintaining the outfeed drive unit 20 in its deenergized condition. Energization of infeed drive unit 18 will rotate the far left hand drive shaft 24 whicn in turn will cause the far left hand or infeed span of conveyor chains 50, 52 to move upwardly as shown in FIG. 3. As the chain moves upwardly, the gondola assemblies 54 mounted between the chains will also move upwardly, causing the cradle members 58 of the gondola to pass through slots 84 in the infeed table 82. As this occurs, the log 88 at the end of the table will be picked up by the gondola assembly. The adjacent log will then roll by gravity to the end of the table where it will be stopped by stop member 84 for subsequent pick-up by the next gondola assembly.

With drive unit 18 energized and drive unit 20 deenergized the movement of the infeed span of the conveyor chains will be accommodated by the downward sliding movement of the left hand take-up sprocket assemblies 16, as best shown in FIG. 4. As infeed drive 18 continues to run left hand take-up sprocket assemblies will travel from their uppermost position to their lowermost position. When such sprocket assemblies reach their lowermost position, continued infeed movement of the conveyor chains will be accommodated by a downward sliding movement of the central take-up sprocket assemblies 16. As shown in FIGS. 6 and 7, as the central sprocket assemblies 16 start their movement downward, spring 48 will cause the locking roller 42 on arm 40 to pivot into its locking position as shown in FIG. 7. In such position any tendency of the far left hand take-up sprocket assemblies 16 to move upwardly will be prevented.

Continued energization of infeed drive 18 (with outfeed drive deenergized) will cause all three pairs of take-up sprocket assemblies 16 to slide from their uppermost positions to their lowermost positions as shown in FIG. 5. When the apparatus reaches the condition shown in FIG. 5, it will have reached its position of maximum accumulation at which point infeed drive 18 will automatically be deenergized by a suitable control mechanism not shown.

Assume, now, that it is desired to transfer logs from the accumulator while at the same time preventing any logs from passing into the accumulator. This is accomplished by energizing outfeed drive unit 20 while infeed drive unit 18 remains deenergized. The energization of outfeed drive unit 20 will rotate the far right hand shaft 24, causing the far right hand or outfeed span of conveyor chain 50, 52 to move downwardly. As the chains move downwardly as described, each log will be discharged from the gondola assembly by the action of stationary pins 94 on frame 10 which cooperate with the cam surfaces 92 on the cam portions 76 of the gondola end plates 60 as best shown in FIGS. 10 and 11. The logs discharged from the gondola assemblies by the tilting movement of the gondola assemblies will be deposited on some kind of a suitable outfeed table 90 from which they will be carried for further processing by a suitable conveyor mechanism (not shown).

With outfeed drive 20 energized and infeed drive 18 deenergized, the movement of the chains at the far right hand infeed spans thereof will be accommodated by upward movement of the far right hand take-up sprocket assemblies 16, then by the middle sprocket assemblies 16 and finally by the left hand infeed sprocket assemblies 16.

As described previously with respect to FIGS. 6 and 7, each of the sprocket assemblies 16 will be held in its lowermost position unitl the adjacent sprocket assemblies 16 reaches their uppermost position at which time arm 46 will be pivoted causing the locking arm 40 and locking roller 42 to move to its unlocked position to thus allow subsequent upward movement of the sprocket assemblies 16.

It will be apparent from the foregoing description that the accumulator apparatus of the present invention is capable, when both drive units 18 and 20 are energized, to simultaneously accept logs into the device at the infeed end and to discharge logs from the device at the outfeed end. The apparatus is also capable, by selective operation of drive units 18 and 20, to accept logs at the infeed end without discharging any logs at the outfeed end and conversely is capable of discharging logs at the outfeed end while not accepting logs at the infeed end.

Thus, for example, should there be a shut down of the gluing machine located upstream of the accumulator, the drive unit 18 can be deenergized until the shut down is corrected while at the same time by running outfeed drive 20, logs 88 accumulated in the machine will be continuously discharged from the outfeed end of the accumulator so that the processing of the logs downstream of the accumulator will not be interrupted. Conversely should there be a shut down of the production line downstream of the accumulator, drive unit 20 can be deenergized until such shut down is corrected while during such shut down by running infeed drive 18 logs 88 can continue to flow into the accumulator to thereby avoid shutting down the processing of the logs upstream of the accumulator.

It will also be appreciated from the description of gondola assemblies 54 that by the use of the spaced plastic cradle members 58 any tendency of the logs to stick to the gondola due to excess glue thereon will be substantially eliminated because of the fact that the glue will normally not adhere to the plastic cradle supports. Further, such gondola assembly is of relatively lightweight construction and is easily assembled from relatively inexpensive parts. Finally, such gondola because of its construction will not collect any appreciable amount of dust or dirt and is therefore easily maintained in a clean condition.

Referring, now, to the operation of the modified embodiment shown in FIG. 14, the operation of such embodiment is quite similar to that of the preferred embodiment described previously. Referring to FIG. 14, assume, for example, that the outfeed drive sprocket B is stationary and the infeed drive sprocket A is driven in a clockwise direction. Such clockwise rotation of infeed sprocket A will cause the far lefthand span C of the conveyor member 114 to move upwardly in a vertical direction, causing the conveyor member to pick up articles from a conveyor means in a manner similar to that described above with respect to the preferred embodiment. Such upward travel of span C with the outfeed span D being stationary will be accommodated by a downward sliding movement of member 106.

Conversely, if the infeed drive sprocket A is stationary and the outfeed drive sprocket B is rotated in a clockwise direction, member 106 will slide upwardly. Finally, if both infeed and outfeed drive sprockets A and B are driven at the same speed, member 106 will remain stationary.

It should be noted that in the FIG. 14 embodiment described above, the necessity for locking mechanisms like that shown in FIGS. 6 and 7 is eliminated. Further-more, in the FIG. 14 embodiment the apparatus will operate when the drive sprockets are driven in a counterclockwise direction causing span C to move downwardly instead of upwardly.

Referring, now, to the operation of the modified embodiment shown in FIG. 15, assume, for example, that the outfeed drive sprocket B is stationary and the infeed drive sprocket A is driven in a clockwise direction. This will cause span C of the endless drive conveyor chain 142 to move horizontally to the right to thereby facilitate loading of articles into the accumulator. With span C of the conveyor chain moving and outlet span D stationary, the movement of only the infeed part of the chain will be accommodated by a sliding movement of member 124 from left to right. The frictional resistance to such movement will be reduced to a minimum by the counterweight assembly described previously.

Conversely, with infeed drive sprocket A stationary and with the outfeed drive sprocket B driven in a clockwise direction, the outfeed span D of the conveyor chain will move downwardly to facilitate unloading of articles from the accumulator. With the outfeed portion of the conveyor chain moving and with the infeed portion of the chain stationary, member 124 will slide on the frame from right to left. As noted with respect to FIG. 14, the FIG. 15 embodiment does not require the use of locking mechanisms like that shown in FIGS. 6 and 7.

I claim:

1. An article accumulator apparatus comprising:
    a frame means (10) having spaced sides and an accumulator spaced therebetween, said frame means having an infeed end and an outfeed end;
    a plurality of vertically spaced pairs of fixed sprockets (14, 15) rotatably mounted on opposite sides of said frame, said sprockets mounted on fixed axes (24), said fixed axes space horizontally from each other between the infeed end and the outfeed end of said frame means;
    a plurality of take-up sprocket assemblies (16) slidably mounted for vertical movement on opposite sides of said frame means intermediate each of said pairs of fixed sprockets, said take-up sprocket assemblies each comprised of upper and lower vertically spaced sprockets (26, 28) rotatably mounted on a mounting member (30) which member is mounted for slidable vertical movement on opposite sides of said frame means;
    a conveyor means mounted in said accumulator space, said conveyor means including a pair of endless chain members reeved over said fixed axis and movable axis sprockets on each side of said frame in a manner to permit said pairs of fixed axis sprockets at either said infeed or outfeed end of said frame means to be rotated while the other pairs remains stationary, said conveyor means further including a plurality of gondola assemblies mounted between and supported by said endless chain members; and
    independently operable drive means for selectively driving one of the fixed sprockets at the infeed and outfeed ends of same frame means.

2. An article accumulator apparatus according to claim 1 in which each of said gondola assemblies is comprised of a cross member, a plurality of article supporting plastic cradle members mounted on said cross member and a pair of plastic end members fastened to the ends of said cross member.

3. An article accumulator apparatus according to claim 2 in which said plastic end members of said gondola assembly are mounted for tilting movement with respect to said endless chain members, said plastic end members further characterized by a cam surface formed thereon which cooperates with a stationary tilt member mounted on said frame so that each of said gondola assemblies will be successively tilted at the outfeed end of the frame causing the articles carried by said gondola assemblies to be discharged from the said assemblies.

4. An article accumulator apparatus according to claim 3 in which said plastic end members are further characterized by a knob portion formed at the lower portion thereof, said knob adapted for snug engagement in openings in the ends of said cross members.

5. An article accumulator apparatus according to claim 4 in which said plastic end members are further characterized by a bushing formed in the upper portion thereof, said bushings adapted to receive support pins fastened to said chain members.

6. An article accumulator apparatus according to claim 2 in which said cradle members of said gondola assemblies have a flat central support surface and a pair of support surfaces angling upwardly from said central support surface.

7. An article accumulator apparatus according to claim 6 in which said angle support surfaces are curved transversely from one edge to the other.

8. An article accumulator apparatus according to claim 7 in which said plastic cradle members have a notch formed in the underside thereof for receiving said cross members.

9. An article accumulator apparatus according to claim 8 in which there are a pair of oppositely facing lip portions formed at the lower end of said notch for providing a snap engagement between said cradle members and said cross members.

10. An article accumulator apparatus according to claim 1 in which said accumulator apparatus includes an inclined infeed table located at the infeed end of the frame, said table extending into the path of travel of said gondola assemblies, said infeed table having spaced notches at the end thereof through which said plastic cradle members of said gondola assemblies can pass so that articles on said infeed table will be successively deposited on said gondola assemblies as said assemblies pass by said infeed table.

11. An article accumulator apparatus according to claim 1 in which there is a locking means (38) for each of said take-up sprocket assemblies operable to hold each of said assemblies in its extreme down position so that said assemblies will move up and down in sequence.

12. An article accumulator apparatus according to claim 11 in which each of said locking means includes a locking arm pivotally mounted on said frame means for movement into and out of locking engagement with one of said take-up sprocket assemblies, said locking means further including an actuating mechanism operatively connected to said locking arm, said actuating mechanism adapted for actuation by the next adjacent take-up sprocket assembly.

* * * * *